Nov. 27, 1951  W. I. KENISON  2,576,122
GRAIN CUTTER GUARD
Filed Feb. 3, 1949
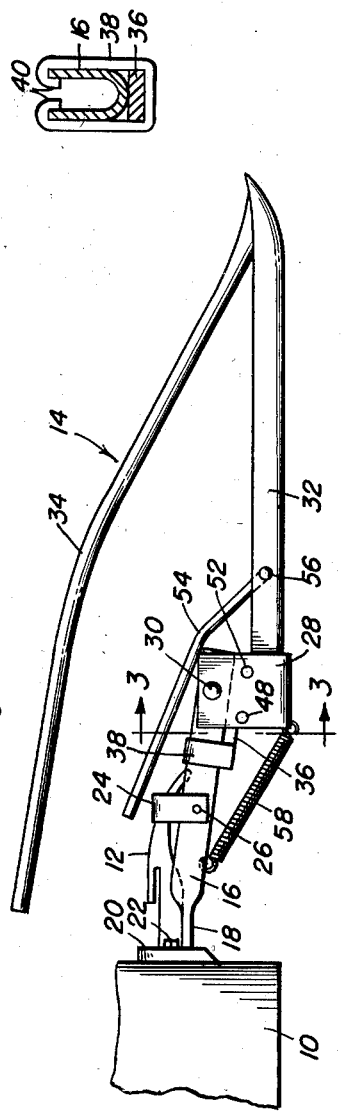
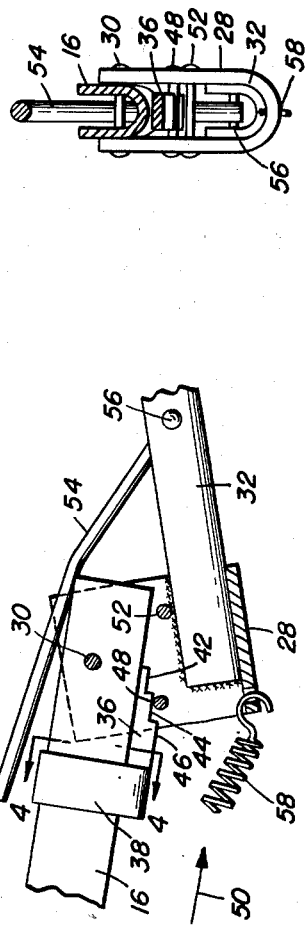
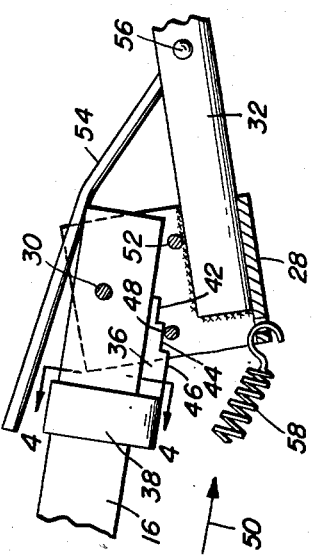
Inventor
William I. Kenison
By Clarence A. O'Brien
and Harvey B. Jacobson
Attorneys Patented Nov. 27, 1951

2,576,122

UNITED STATES PATENT OFFICE 2,576,122

GRAIN CUTTER GUARD

William I. Kenison, Salina, Kans.

Application February 3, 1949, Serial No. 74,398

5 Claims. (Cl. 56—312)

1

This invention relates to new and useful improvements and structural refinements in grain guards or grain savers, more specifically, devices of this class which are adapted to be secured to the platform of a harvester or mowing machine so as to run in advance of the sickle for the purpose of lifting fallen grain and supporting the same in proper position for cutting.

In particular, the instant invention is an improved modification of a similar device for which a U. S. Patent No. 1,818,335 was granted to me on August 11, 1931. While experimenting with and using a grain guard or saver constructed in accordance with the teachings of this earlier patent I found that the same lends itself to certain structural and functional improvements, whereby the construction thereof is substantially simplified and its operation rendered more efficient. It is, therefore, the principal object of the instant invention to provide a grain guard or saver wherein such improvements and modifications are embodied.

One of the features of the invention involves the provision of novel means for supporting the guard arm of the device in a predetermined position relative to the platform of the harvesting machine, these means being of an adjustable nature so that the position of the guard arm may be varied as necessitated by the requirements of the work.

Another feature of the invention involves the provision of a stop to prevent excessive lifting of the guard arm above the ground.

A still further feature of the invention resides in the provision of a secondary or auxiliary lifting rod in addition to the primary lifting rod with which the guard is provided, the secondary lifting rod being movably attached to the guard arm and extending over the sickle guarding finger so as to prevent accumulation of short straw and other foreign materials thereon.

Some of the advantages of the invention reside in its simplicity of construction and in its adaptability to economical manufacture.

With the above more important objects and features in view and such other objects and features as may become apparent as this specification proceeds, the invention consists essentially of the construction and arrangement of parts as shown in the accompanying drawings in which:

Figure 1 is a side elevational view of the invention in association with a harvester platform, the latter being partially broken away;

Figure 2 is an enlarged cross sectional detail showing a portion of the invention in a position different from that illustrated in Figure 1;

Figure 3 is a cross sectional view, taken substantially in the plane of the line 3—3 in Figure 1, and

2

Figure 4 is a cross sectional view, taken substantially in the plane of the line 4—4 in Figure 2.

Like characters of reference are employed to designate like parts in the specification and throughout the several views.

Referring now to the accompanying drawings in detail, the reference character 10 designates a portion of the platform of a harvester or mowing machine provided at the forward edge thereof with a set of guarding fingers 12 for the sickle mechanism (not shown), the invention consisting of a grain guard or saver designated generally by the reference character 14.

The guard 14 embodies in its construction a supporting arm 16 which is preferably of a U-shaped cross section as illustrated in Figure 4, one end portion of this arm being flattened as at 18 in Figure 1 and being provided with a bolting flange 20 whereby it may be secured to the platform 10 by the same screws 22 which are employed for attaching the sickle guarding fingers 12 to the platform, as will be clearly apparent. The supporting arm 16 preferably extends under the finger 12 and a suitable clip 24, attached to the arm 16 as at 26 passes over the finger to assist in retaining the arm 16 in its proper position.

A substantially U-shaped saddle 28 straddles the forward portion of the supporting arm 16 and is pivotally connected thereto by means of a transversely extending pin or rivet 30, and a guard arm 32 of a U-shaped cross sectional configuration has the rear end portion thereof secured by welding, or the like, in the saddle 28, substantially as shown. A primary lifting rod 34, configurated as shown in Figure 1, is rigidly secured at its forward end to the forward end portion of the guard arm 32 and extends rearwardly and upwardly therefrom above the sickle guarding finger 12, so that when the invention is placed in use the rod 34 will lift fallen grain and support it in proper position for cutting.

The construction thus described is similar to that disclosed in my prior patent, and one of the features of the instant invention involves the provision of adjustable means for retaining or supporting the guard arm 32 in a predetermined position relative to the arm 16, so that the distance of the arm 32 above the ground may be varied as necessitated by the nature of the work.

These means involve the provision of a block 36 which is slidably disposed at the underside of the supporting arm 16 and is provided with a U-shaped clamp 38 whereby it is slidably retained in position on the arm 16, as is best shown in Figure 4. In this connection it may be pointed out that the free end portions of the clamp 38 are downturned as at 40 over the upper edges of the arm 16, whereby the block 36 is not only slidably retained in position but whereby convenient installation and removal of the block is facilitated. The clamp 38 may be secured to the block 36 in any desired manner.

The undersurface of the block 36 is provided with a plurality of steps 42, 44, 46 (see Figure 2) and a pin 48 extends transversely through the saddle 28, as shown. The pin 48 is engageable selectively with the undersurface of the arm 16 and with the different steps 42, 44, 46 of the block 36, this being effected, of course, by simply sliding the block and the associated clamp 38 along the arm 16, so that the different thicknesses of the block, resulting from its stepped formation, may be interposed between the pin 48 and the arm 16 so as to support the guard arm 32 in a predetermined position relative to the ground and to the platform 10. In other words, by progressively sliding the block 36 forwardly on the arm 16 (in the direction of the arrow 50) the arm 32 will be correspondingly raised, while rearward sliding of the block on the arm 16 will result in supporting the arm 32 in a correspondingly lowered position. Ultimately, if the block 36 is slid rearwardly to a position where the pin 48 is engageable with the arm 16, the arm 32 will be supported in its utmost lowered position, as will be clearly apparent.

Another feature of the invention involves the provision of a transversely extending pin 52 in the saddle 28, this pin being engageable with the arm 16 forwardly of the pivot 30 and providing a stop to restrict excessive upward movement of the guard arm 32.

While the aforementioned lifting rod 34 may be quite satisfactory for raising fallen grain to a proper position for cutting, a secondary lifting rod 54 is hinged or pivoted to an intermediate portion of the guard arm 32 as at 56, this secondary rod extending upwardly and rearwardly so as to overlie the forward end portion of the support arm 16 and the sickle guarding finger 12.

By virtue of its pivotal connection 56, the secondary rod 54 is free to move and by virtue of its presence as well as of its movement it will be found to be quite effective in discouraging and preventing accumulation of short straw and other foreign matter on the guard finger 12 and on the sickle, which material, if permitted to accumulate, would eventually obstruct and hinder the operation of the sickle mechanism as will be clearly apparent.

It is to be noted that a suitable tension spring 58 is anchored at one end to the saddle 28 and at its remaining end to the supporting arm 16 for the purpose of urging the guard arm 32 downwardly and the pin 48 against the block 36 or against the arm 16, as the case may be.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a grain guard, the combination of a supporting arm associated with a sickle guarding finger, a U-shaped saddle pivoted to said supporting arm, a liftable and lowerable guard arm secured to said saddle, and adjustable means for holding said guard arm in a predetermined position relative to said supporting arm and also for reinforcing said supporting arm, said means comprising a transverse pin provided in said saddle, and a block slidably engaging said supporting arm and having a stepped undersurface, said pin being engageable selectively with said supporting arm and with the steps on the undersurface of said block.

2. The combination of claim 1 together with a second transverse pin provided in said saddle, said last mentioned pin being engageable with said supporting arm to limit upward movement of said guard arm.

3. In a grain guard, the combination of an elongated supporting arm having a forward end, an elongated guard arm having rear and forward ends, the supporting arm and the guard arm being pivotally connected adjacent the forward and rear ends thereof respectively for vertical movement of the latter, a grain lifting rod carried by the guard arm, adjustable means carried by the arms for limiting pivotal movement of the guard arm and also for reinforcing the supporting arm, a sickle guarding finger, said supporting arm being U-shaped and partially housing the finger, said grain lifting rod being pivotally connected to the guard arm and extending upwardly and rearwardly therefrom for lifting grain, said lifting rod extending into engagement with the supporting arm for protecting said finger and being normally retained in such engagement by its own weight, said adjustable means including an elongated block slidably engaging the underside of the supporting arm, said block having a stepped underside, and a stop carried by the guard arm for engagement with the stepped underside to limit pivotal movement of the guard arm.

4. The combination of claim 3 including a primary lifting rod secured to and extending upwardly and rearwardly from the forward end of the guard arm above the first mentioned lifting rod.

5. In a grain guard, the combination of an elongated supporting arm having a forward end, an elongated guard arm having rear and forward ends, the supporting arm and the guard arm being pivotally connected adjacent the forward and rear ends thereof respectively for vertical movement of the latter, a grain lifting rod carried by the guard arm, adjustable means carried by the arms for limiting pivotal movement of the guard arm and also for reinforcing the supporting arm, the rear end of the guard arm being positioned below the forward end of the supporting arms with the arms being pivotally connected by a saddle, said adjustable means including an elongated block slidably secured to the underside of the supporting arm, said block having a stepped undersurface, and means carried by the saddle engaging the stepped undersurface of the block.

WILLIAM I. KENISON.

REFERENCES CITED

The following references are of record in the file of this patent:

UNITED STATES PATENTS

| Number | Name | Date |
|---|---|---|
| 658,133 | Ullmann | Sept. 18, 1900 |
| 777,733 | Kane et al. | Dec. 20, 1904 |
| 1,818,335 | Kenison | Aug. 11, 1931 |
| 2,290,404 | Cardinal | July 21, 1942 |